(12) United States Patent
Huang et al.

(10) Patent No.: US 9,203,310 B2
(45) Date of Patent: Dec. 1, 2015

(54) SINGLE INDUCTOR MULTI-OUTPUT (SIMO) CONVERSION DEVICE FOR ENLARGING LOAD RANGE

(71) Applicant: National Chung Cheng University, Chia-Yi (TW)

(72) Inventors: Chung-Hsun Huang, Tainan (TW); Chao-Chun Chen, Kaohsiung (TW); Zhen-Yu Sun, Chia-Yi (TW)

(73) Assignee: NATIONAL CHUNG CHENG UNIVERSITY, Chia-Yi (TW)

( * ) Notice: Subject to any disclaimer, the term of this patent is extended or adjusted under 35 U.S.C. 154(b) by 81 days.

(21) Appl. No.: 14/145,631

(22) Filed: Dec. 31, 2013

(65) Prior Publication Data

US 2015/0008742 A1 Jan. 8, 2015

(30) Foreign Application Priority Data

Jul. 5, 2013 (TW) .............................. 102124204 A

(51) Int. Cl.
*H02M 3/02* (2006.01)
*H02M 1/00* (2007.01)
(Continued)

(52) U.S. Cl.
CPC ........ *H02M 3/158* (2013.01); *H02M 2001/009* (2013.01); *Y10T 307/406* (2015.04)

(58) Field of Classification Search
CPC ............ H02M 3/02; H02M 2001/007; H02M 2001/009; G05F 3/24; G05F 1/575; G05F 1/56
USPC ............. 323/265–268, 270, 279, 280; 307/31
See application file for complete search history.

(56) References Cited

U.S. PATENT DOCUMENTS

2006/0220622 A1* 10/2006 Yamanaka et al. ............ 323/267
2011/0043181 A1* 2/2011 Jing et al. ...................... 323/288
(Continued)

FOREIGN PATENT DOCUMENTS

DE 10 2009 005 013 7/2010
EP 2 199 570 6/2010
(Continued)

OTHER PUBLICATIONS

Wing-Hung Ki, et al., "Single-Inductor Multiple-Output Switching Converters", IEEE, 2001, pp. 226-231.
(Continued)

*Primary Examiner* — Timothy J Dole
*Assistant Examiner* — Sisay G Tiku
(74) *Attorney, Agent, or Firm* — Muncy, Geissler, Olds & Lowe, P.C.

(57) ABSTRACT

A single-inductor multi-output (SIMO) conversion device for enlarging load range is disclosed. The SIMO conversion device comprises a power stage comprising a first switch and a second switch and receiving a direct-current (DC) current. A DC voltage source inputs the DC current to an inductor by timing of the first and second switches. Each control output circuit has a third switch connected with the inductor in series to receive an immediate current. The control output circuit sends out an output voltage selectively by the third switch. A control stage circuit receives a plurality of feedback voltage signals and selectively controls the order of adjusting energy of the output voltages by order control signals. The present invention uses a current sensing circuit to obtain the immediate current and switches control signals to establish the best order thereof according to different loads.

7 Claims, 10 Drawing Sheets

(51) Int. Cl.
*G05F 3/24* (2006.01)
*G05F 1/575* (2006.01)
*G05F 1/56* (2006.01)
*H02M 3/158* (2006.01)

(56) References Cited

U.S. PATENT DOCUMENTS

| | | | |
|---|---|---|---|
| 2011/0089917 A1* | 4/2011 | Chen et al. | 323/282 |
| 2012/0169307 A1* | 7/2012 | Chen et al. | 323/271 |
| 2012/0274134 A1* | 11/2012 | Gasparini et al. | 307/31 |
| 2014/0145692 A1* | 5/2014 | Miyamae | 323/271 |

FOREIGN PATENT DOCUMENTS

| | | |
|---|---|---|
| EP | 2 278 127 | 1/2011 |
| WO | WO 2009/068460 | 6/2009 |

OTHER PUBLICATIONS

Dongsheng Ma, et al., "Single-Inductor Multiple-Output Switching Converters With Time-Multiplexing Control in Discontinuous Conduction Mode", IEEE Journal of Solid-State Circuits, vol. 38, No. 1, Jan. 1, 2003, pp. 89-100.

Dongsheng Ma, et al., "A Psuedo-CCM / DCM SIMO Switching Converter with Freewheel Switching", ISSCC 2002 / Session 23 / Analog Techniques / 23.6, 2002, IEEE International Solid-State Circuits Conference, 3 pages.

Dongsheng Ma, et al., "A Psuedo-CCN/DCM SIMO Switching Converter With Freewheel Switching", IEEE Journal of Solid-State Circuits, vol. 38, No. 6, Jun. 2003, pp. 1007-1014.

Jingbin Jia, et al., "A Single-Inductor Dual-Output Pseudo-DCM/CCM Buck and Boost Converter in 90nm CMOS Technology", IEEE, 2008, 4 pages.

Yang Yang, et al., "A Single-Inductor Dual-Output Buch Converter with Self-Adapted PCCM Method", IEEE, 2009, pp. 87-90.

Xiaocheng Jing, et al., "A Wide-Load-Range Single-Inductor-Dual-Output Boost Regulator with Minimized Cross-Regulation by Constant-Charge-Auto-Hopping (CCAH) Control", IEEE, 2009, Custom Intergrated Circuits Conference (CICC), pp. 299-302.

Suet-Chui Koon, et al., "Intergrated Charge-Control Single-Inductor Dual-Output Step-Up/Step-Down Converter", IEEE, 2005, pp. 3071-3074.

* cited by examiner

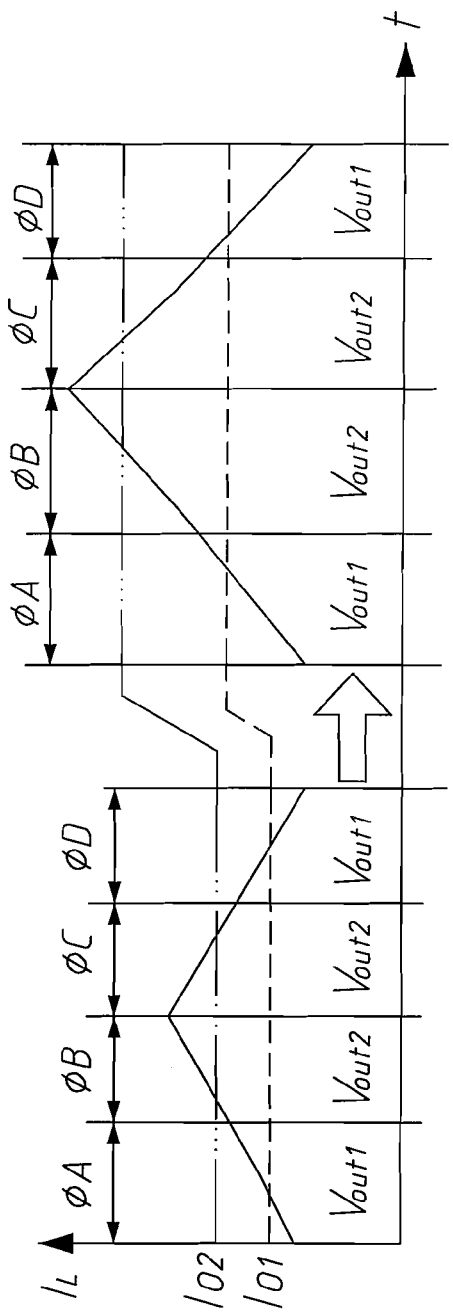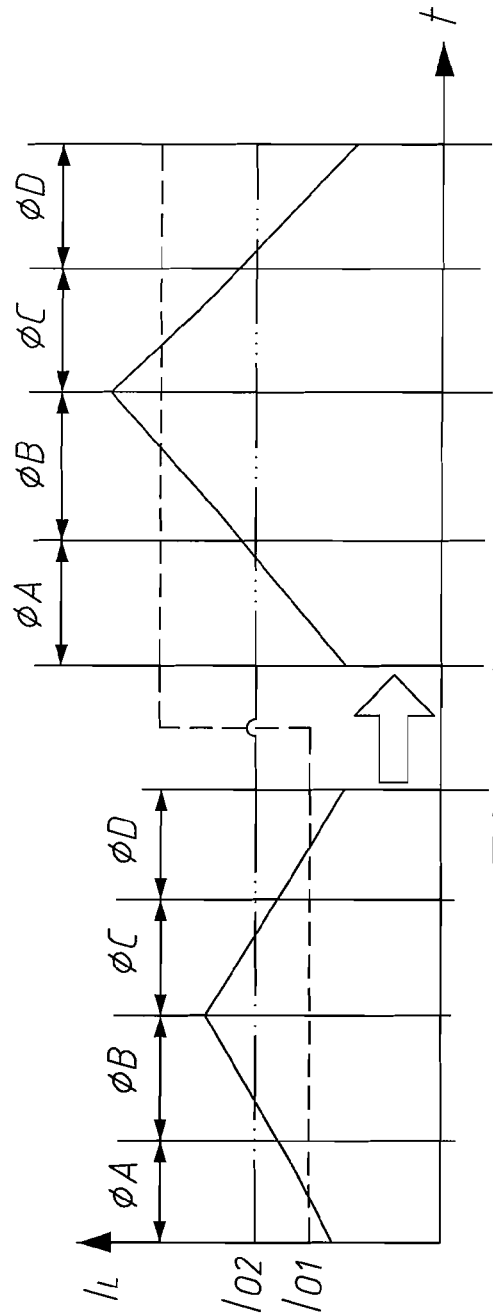

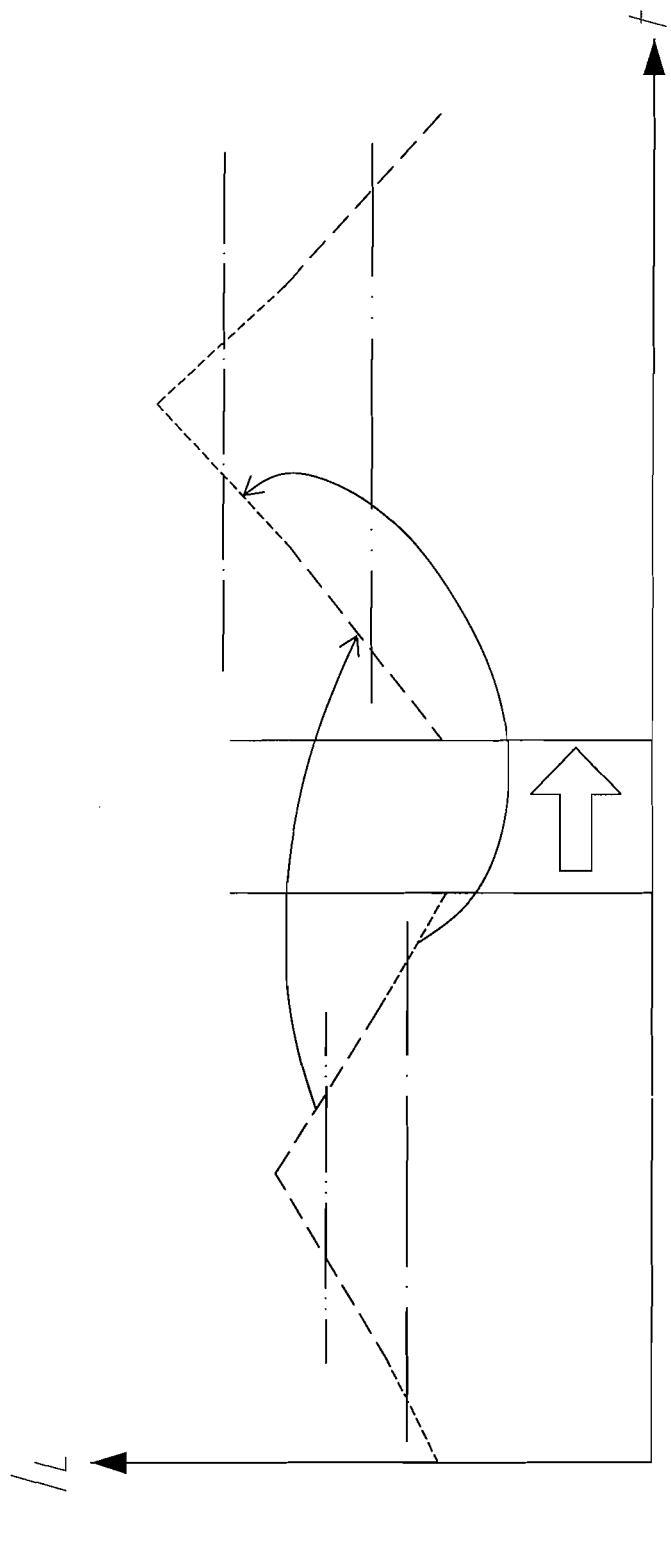

SINGLE INDUCTOR MULTI-OUTPUT (SIMO) CONVERSION DEVICE FOR ENLARGING LOAD RANGE

This application claims priority for Taiwan patent application no. 102124204 filed on Jul. 5, 2013, the content of which is incorporated by reference in it entity.

BACKGROUND OF THE INVENTION

1. Field of the Invention

The present invention relates to a power management conversion output device, particularly to a single-inductor multi-output (SIMO) power management conversion output device.

2. Description of the Related Art

In the recent years, with the development and progress of IC fabrication process, the area of a chip is smaller and smaller and the chip has more and more functions. As a result, the volumes of all kinds of products are scaled down, such as mobile phones, handheld computers, digital media players and computers. The trend of the electronic products is toward to light weight and small volume, thereby producing portable electronic products.

In general, users expect that the products have small volumes, complete functions, strong performances and long operation time. In order to satisfy the requirement, circuits with different functions are installed in the product, and the circuits require different driving voltages. Since an external power supply only provides a fixed voltage, a DC converter in a power management device has to provide different output voltages for the circuits.

In practice, the internal circuits of the product perform different functions. As a result, the internal circuits require different voltages and load currents. A good power management device has to provide different output voltages, and each output voltage can provide enough large load current range to adapt to different operations. Accordingly, how batteries of portable electronic products possess the longest life and the greatest efficiency for use to achieve the greatest performance of the products and increase competitiveness is an important topic.

Further, a good power management device comprises a plurality of switched voltage converters. Power transistors and inductors of the converters occupy a very large area, which is a cost disadvantage. In the recent years, a single-inductor multi-output (SIMO) architecture is a popular solution to area occupation.

The SIMO architecture is different from the traditional DC to DC converter and decreases the amount of inductors, thereby saving the cost and improving competitiveness of products. It is apparent to reduce the area of print circuit boards without using inductors, thereby microminiaturizing portable products.

Nowadays, with the trend of integrating ICs, the power management device has to receive an input voltage to send out different voltages to different devices and circuits for use. By using the SIMO architecture, a power management device can convert power the most efficiently in cooperation with the least external inductors or capacitive elements. The power management device can provide stable output voltages and output currents required to efficiently use the batteries.

The SIMO architecture uses only one inductor and provides different voltages for multiple function circuits of a portable product. Although the SIMO DC to DC converter can save the chip area, the different output voltages still result in cross regulation. Cross regulation is more apparent when the conditions for the output load currents are different. Cross regulation becomes serious and affects the regulation effect when the output loads of the converter have greater difference.

However, the SIMO architecture still has the following problems:

(1) The more the amount of the outputs, the more the amount of interference sources causing cross regulation. Thus, it is harder to maintain the regulation.

(2) If the load range of the SIMO architecture is enlarged, the output voltages have to be stable in a light-load state or a heavy-load state. Limited by cross regulation, the converter can not operate in continuous conduction mode (CCM) in a heavy-load state. As a result, the heavy currents are limited not to enlarge the current range.

(3) When the SIMO architecture operates to reduce cross regulation, the output ripple voltages become higher.

In addition, since a single-inductor one-output architecture simply has an output voltage, a control circuit adjusts one output voltage within one switched period. Since the SIMO architecture has two or more output voltages, a control circuit adjusts at least two output voltages within one switched period. Thus, the influence is described as the followings:

(1) When the amount of the output voltages increase, the time distributed to each output is not enough within one period to compress the time that any output voltage charges or discharge the inductor.

(2) When one output load changes, the charge and discharge time is also adjusted. Then, the final value of the inductor current can affect the next output voltage when the inductor discharges.

(3) The inductor energy provided by source power is too low to assign to each output.

According to the abovementioned, when one output load of the SIMO converter changes, the control circuit has to adjust a duty cycle for the output load condition. However, during the adjustment process, the other output voltages not to need adjustment are possibly affected. The output voltages will be varied and unstable. The phenomenon that the voltage variation comes from the change of another output voltage is called cross regulation. Serious cross regulation leads to unstable output voltages.

Refer to FIGS. 1a-1d. FIG. 1a is a diagram schematically showing charge and discharge currents of an inductor of a SIMO architecture in the traditional technology. FIG. 1b is a diagram schematically showing charge and discharge currents of a light load and a heavy load of a single-inductor two-output architecture in the traditional technology. FIG. 1c is a diagram schematically showing charge and discharge currents of a single-inductor two-output architecture for a fixed time in the traditional technology. FIG. 1d is a diagram schematically showing charge and discharge currents of a single-inductor two-output architecture on continuous or discontinuous conduction threshold in the traditional technology. FIG. 1e is a diagram schematically showing charge and discharge currents of a single-inductor two-output architecture in energy-conservation mode in the traditional technology. An upper diagram and a lower diagram of FIG. 1a respectively show charge and discharge currents of the inductor for two outputs and four outputs. In FIGS. 1a-1e, $I_L$ denotes an inductor current, T denotes a switched period, and t denotes time.

Compared with two output voltages $V_{out1}$ and $V_{out2}$, the charge and discharge time of one of four voltages $V_{out1}$, $V_{out2}$, $V_{out3}$ and $V_{out4}$ are shortened (period T/2→period T/4) without changing period such that the time that the inductor current stores or discharges energy is shortened. In other words, when one of the four voltages $V_{out1}$, $V_{out2}$, $V_{out3}$ and $V_{out4}$ operates in a heavier-load state than a previous state, the charge time is shortened due to the fact that the period changes, thereby resulting in an inaccurate output value. Alternatively, the discharge time is too short to satisfy a stable condition of the inductor current $$\left[i_L\left(\frac{T}{4}\right) = i_L(0)\right].$$

Meanwhile, another output voltage has operated, which results in an output voltage error.

Refer to FIG. 1b which explains the abovementioned. Take the SIMO architecture for example. Suppose the time (such as T/2) that each output voltage $V_{out1}$ and $V_{out2}$ distributes the charge and discharge energy to the inductor is fixed, and the time (such as T/2) that the inductor current $I_L$ charges and discharges energy is fixed. When the output voltage $V_{out1}$ operates from the light-load state to the heavy-load state, the time that the inductor is charged needs to increase due to that the fact the output voltage $V_{out1}$ requires more energy. Thus, the time that the inductor current $I_L$ is shortened not to satisfy a stable condition of the inductor current $$\left[i_L\left(\frac{T}{2}\right) = i_L(0)\right].$$

Meanwhile, the output voltage $V_{out2}$ has been adjusted, which apparently interferes with an initial value of the inductor current $I_L$ of the output voltage $V_{out2}$.

The same phenomenon occurs in different charge and discharge mode of inductor energy. For example, the operation of FIG. 1c is different from that of FIG. 1a and FIG. 1b. In FIG. 1c, the time that the inductor current $I_L$ charges energy is fixed and different loads are discharged in order within other time of a period. As a result, in any case, the energy obtained by the charge of the inductor current $I_L$ is a fixed value in the first semi-period. In the second semi-period, the energy is distributed to each output voltage $V_{out1}$ and $V_{out2}$ in order. Therefore, when the load of the output voltage $V_{out1}$ changes, the energy obtained by the output voltage $V_{out2}$ is directly affected, thereby resulting in voltage variation. From FIG. 1c, the more the energy that the output voltage $V_{out1}$ requires, the longer the time that the inductor current $I_L$ discharges energy. However, the long time compresses the adjustment for $V_{out2}$.

Refer to FIG. 1d which proved that the influence on another output voltage when the output load changes beyond continuous or discontinuous conduction threshold. When the converter is in a stable state, the average currents are expressed by the equations 1-3:

$$I_{OA} = \frac{1}{2} \cdot \frac{V_{IN}}{L} \times \frac{M_A - 1}{M_A^2} \times \frac{\phi_A^2}{\phi_A - \phi_B} \quad \text{Equation 1}$$

$$I_{OB} = \frac{1}{2} \cdot \frac{V_{IN}}{L} \times \frac{M_B - 1}{M_B^2} \times \frac{\phi_B^2}{\phi_A + \phi_B} \quad \text{Equation 2}$$

$$\frac{I_{OA}}{I_{OB}} = \left(\frac{M_B}{M_A}\right)^2 \times \left(\frac{M_A - 1}{M_B - 1}\right) \times \left(\frac{\phi_A}{\phi_B}\right)^2 \quad \text{Equation 3}$$

Wherein $V_{IN}$ is an input voltage, L is an inductor, $$M_A = \frac{V_{OA}}{V_{IN}}, M_B = \frac{V_{OB}}{V_{IN}},$$

$V_{OA}$ and $V_{OB}$ are output voltages of two ends, $\phi_A$ is operation phase time of a load current $I_{o1}$, and $\phi_B$ is operation phase time of a load current $I_{o2}$. According to the equations of $I_{OA}$ and $I_{OB}$, when the output current $I_{OA}$ (or $I_{OB}$) increases whereby $\phi_A$ (or $\phi_B$) varies over $$\frac{T}{2},$$

another output voltage will be affected.

According to the waveforms of the inductor currents, it is known that the continuous relations exist between the inductor current $I_L$ and the outputs, which results in cross regulation. In other words, the discontinuous relations exist between the inductor current $I_L$ and the outputs, which difficulty results in cross regulation.

Refer to FIG. 1e. In the traditional technology, a power stage energy-storage element stores energy, and then discharges the energy in order. The energy-storage element stores energy in two stage of energy-conservation mode (ECM). The energy obtained in the first storage stage are provided to the output voltage $V_{out1}$, and the energy obtained in the second storage stage are provided to the output voltage $V_{out2}$. Since the energy that each output voltage requires are independently distributed, the energy are enough to use. Even if the output voltage $V_{out1}$ requires large energy, the output voltage $V_{out1}$ does not seize the output voltage $V_{out2}$. As a result, the cross regulation can be greatly reduced. The energy obtained in the first storage stage is conserved until the energy-storage activity for another output voltage is finished, as shown in FIG. 1e. $\Phi_A$ and $\Phi_B$ are respectively intervals of the energy-storage activity for the output voltages $V_{out1}$ and $V_{out2}$. $\Phi_C$ and $\Phi_D$ are respectively intervals of the energy-discharge activity for the output voltages $V_{out1}$ and $V_{out2}$.

In ECM, the relation and the order of the energy-storage and energy-discharge activities of different output voltages make the allowable road range of each output not to be limited by cross regulation. In fact, the order of the power stage energy-storage and energy-discharge activities depends on the output loads. For the energy-storage activity of ECM, the adjustment activities are performed on the output voltages according the order from the lightest load closer to the heaviest load. However, when the adjustment order is fixed, the magnitude of the output loads changes, which still results in cross regulation.

To overcome the abovementioned problems, the present invention provides a single-inductor multi-output (SIMO) conversion device for enlarging load range, so as to solve the afore-mentioned problems of the prior art.

SUMMARY OF THE INVENTION

A primary objective of the present invention is to provide a single-inductor multi-output (SIMO) conversion device for enlarging load range, which uses a current sensing circuit to obtain an immediate current in energy-conservation mode (ECM), thereby switching control signals to establish the best order thereof according to the transient change of different loads, whereby the problem with cross regulation due to the fixed adjustment order is solved.

Another objective of the present invention is to provide a SIMO conversion device for enlarging load range, which solves the cross regulation of outputs caused by the load variation in ECM and enlarges the load range of the outputs. When the output loads seriously change, the SIMO conversion device increases the transient response speed to rapidly regulate voltages.

To achieve the abovementioned objectives, the present invention provides a SIMO conversion device for enlarging load range, which is coupled to an input voltage terminal having a direct-current (DC) voltage source and a grounding terminal to send out a DC current. The SIMO conversion device sends out a plurality of output voltages to a plurality of loads respectively. The SIMO conversion device comprises a power stage and a control stage circuit. The power stage comprises a first switch coupled to the DC voltage source to receive the DC current. A second switch is coupled between the first switch and the grounding terminal to receive the DC current, and the first switch, the second switch and the DC voltage source constitute an electric loop. An inductor is coupled between the first switch and the second switch, and the DC voltage source sends out the DC current to the inductor selectively by the first switch or the second switch, whereby the inductor sends out an immediate current, or whereby the second switch discharges an inductor current to the grounding terminal. Each of a plurality of control output circuits has a third switch, and each third switch connects with the inductor in series to receive the immediate current, and the control output circuit sends out the output voltage selectively by the third switch and obtains a feedback voltage signal from the corresponding load. The control stage circuit is coupled to the power stage to receive the feedback voltage signals, sends out a plurality of control signals according to a reference voltage, respectively converts the control signals into a plurality of order control signals according to a duty cycle algorithm, and selectively controls an order of adjusting energy of the output voltages by the order control signals.

Below, the embodiments are described in detail in cooperation with the drawings to make easily understood the technical contents, characteristics and accomplishments of the present invention.

BRIEF DESCRIPTION OF THE DRAWINGS

FIG. 5c is a waveform showing the inductor current without changing the order of controlling loads according to the second case of the present invention;

FIG. 5d is a waveform showing the inductor current with changing the order of controlling loads according to the second case of the present invention;

FIG. 5e is a diagram showing the change of controlling the order according to an embodiment of the present invention;

DETAILED DESCRIPTION OF THE INVENTION

The present invention provides a novel technique to improve cross regulation due to bad adjustment order in energy-conservation mode in the traditional technology.

Figure 1B:
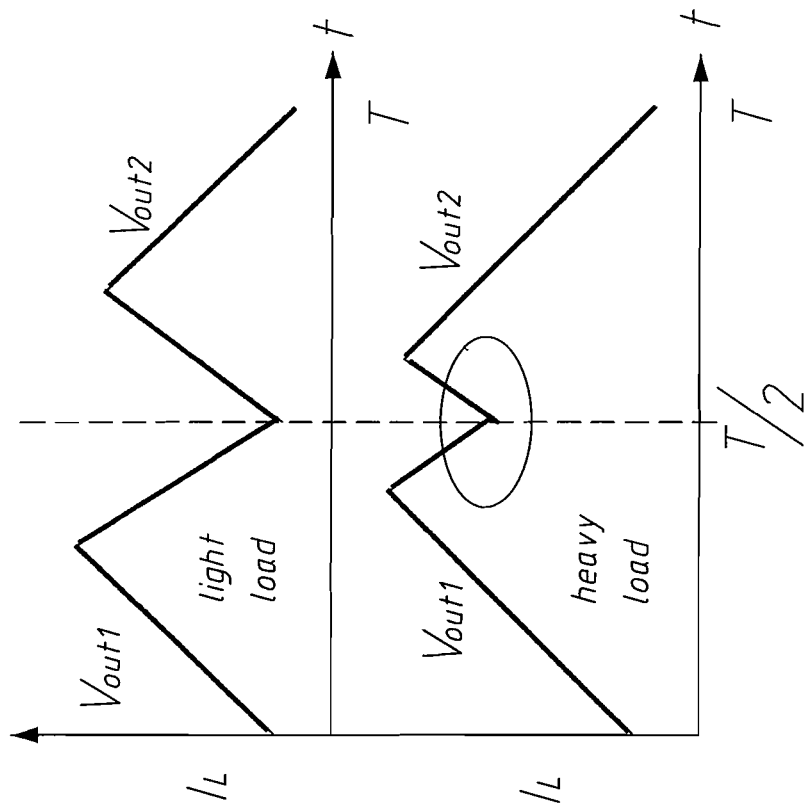
FIG. 1b is a schematic diagram showing charge and discharge currents of a light load and a heavy load of a single-inductor two-output architecture in the traditional technology.
Figure 1A:
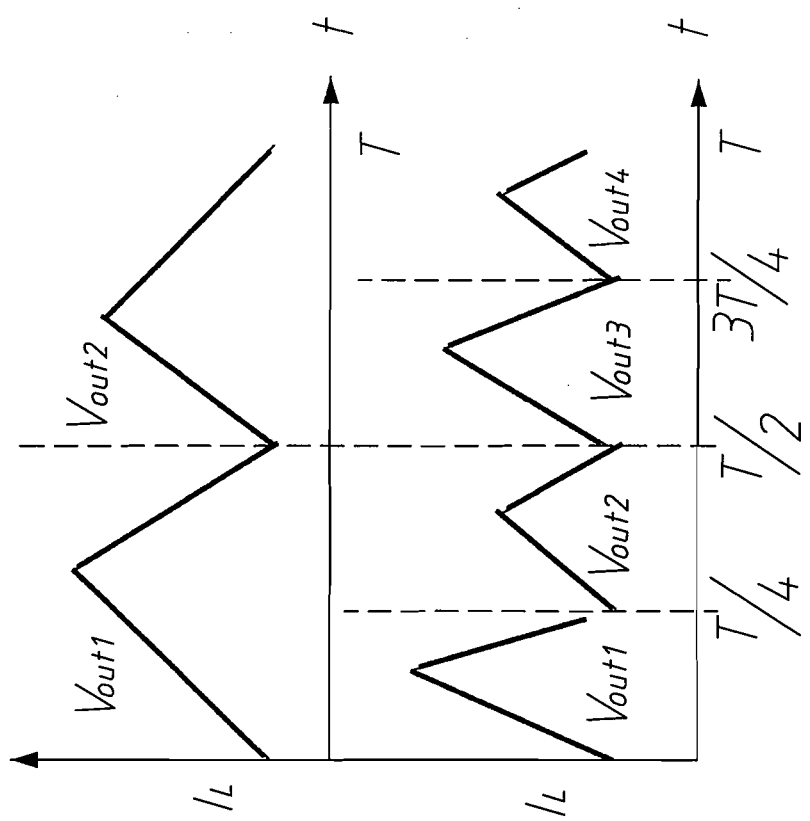
FIG. 1a is a schematic diagram illustrating charge and discharge currents of an inductor of a single-inductor multi-output (SIMO) architecture in the traditional technology.
Figure 1C:
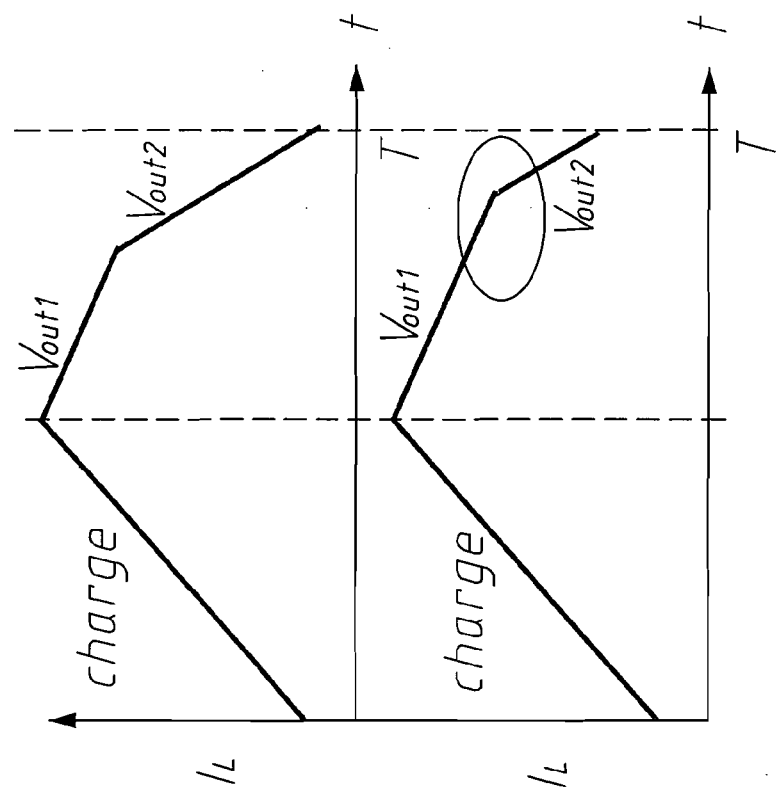
FIG. 1c is a schematic diagram showing charge and discharge currents of a single-inductor two-output architecture for a fixed time in the traditional technology.
Figure 1D:
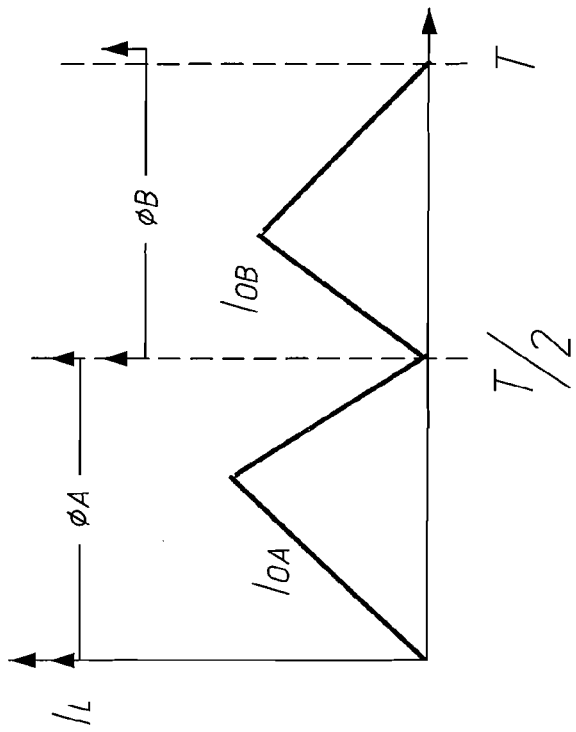
FIG. 1d is a schematic diagram showing charge and discharge currents of a single-inductor two-output architecture on continuous or discontinuous conduction threshold in the traditional technology.
Figure 1E:
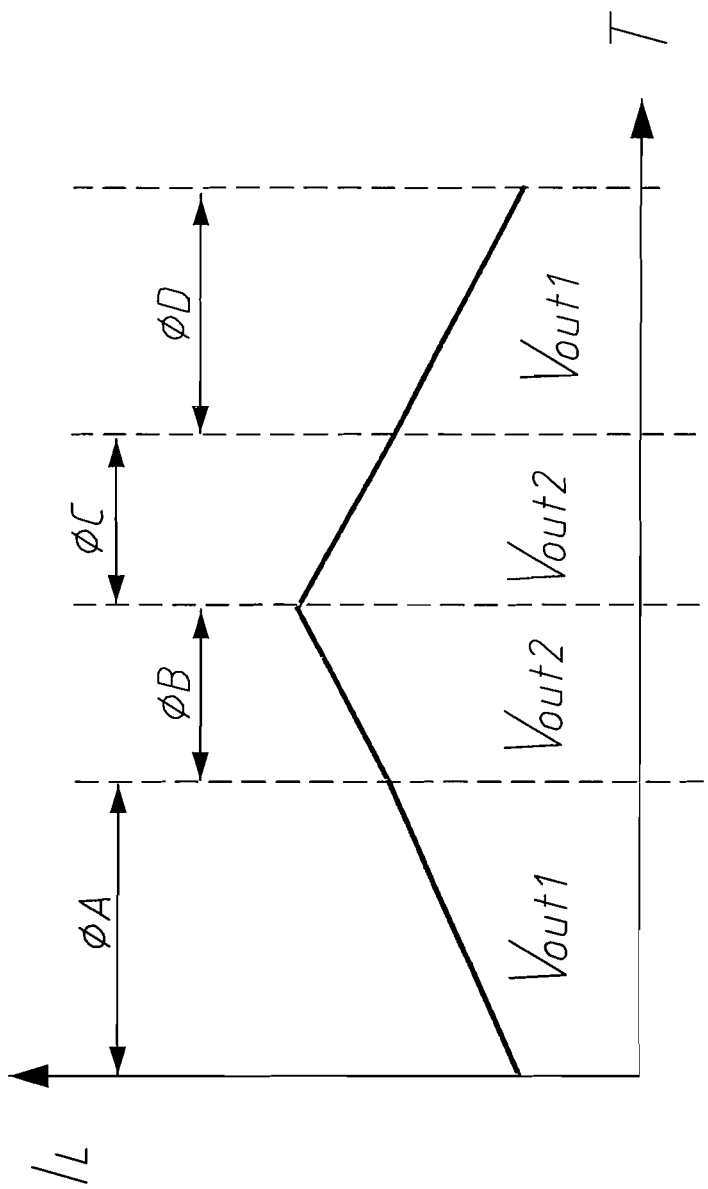
FIG. 1e is a schematic diagram showing charge and discharge currents of a single-inductor two-output architecture in energy-conservation mode (ECM) in the traditional technology.
Figure 2:
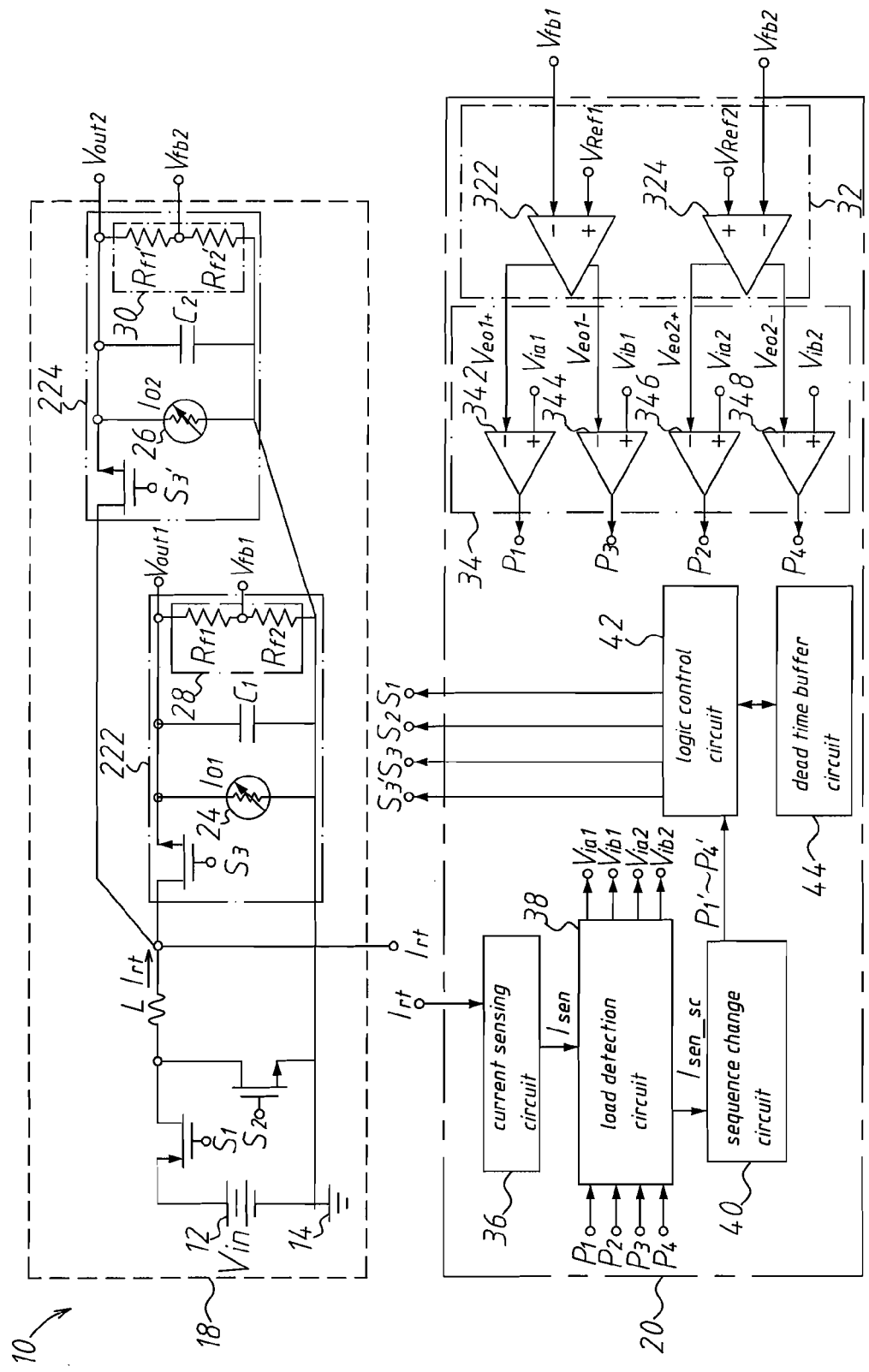
FIG. 2 is a schematic diagram showing a SIMO DC to DC converter according to an embodiment of the present invention.

The present invention exemplifies an embodiment. Refer to FIG. 2 which explains a single-inductor multi-output (SIMO) conversion device for enlarging load range Of the present invention. The SIMO conversion device 10 for enlarging load range is coupled to an input voltage terminal $V_{in}$ which has a direct-current (DC) voltage source 12 and a grounding terminal 14 to send out a DC current. The SIMO conversion device 10 sends out a plurality of output voltages $V_{out1}$ and $V_{out2}$ to a plurality of equivalent variable loads 24 and 26 respectively. The SIMO conversion device 10 comprises a power stage 18 and a control stage circuit 20.

As the abovementioned, the power stage 18 comprises a first switch $S_1$ coupled to the DC voltage source 12 to receive the DC current. A second switch $S_2$ is coupled between the first switch $S_1$ and the grounding terminal 14 to receive the DC current. The first switch $S_1$, the second switch $S_2$ and the DC voltage source $V_{in}$ constitute an electric loop. An inductor L is coupled between the first switch $S_1$ and the second switch $S_2$. The DC voltage source 12 sends out the DC current to the inductor L by the first switch $S_1$, whereby the inductor L sends out an immediate current $I_{rt}$. Alternatively, the DC voltage source 12 sends out the DC current to the inductor L by the second switch $S_2$, whereby the second switch $S_2$ discharges an inductor current $I_L$ to the grounding terminal 14. The power stage 18 further comprises a plurality of control output circuits, such as control output circuits 222 and 224. Each of the control output circuits 222 and 224 has a third switch $S_3$ or $S_3'$. Each third switch $S_3$ or $S_3'$ connects with the inductor L in series to receive the immediate current $I_{rt}$. According to the immediate current $I_{rt}$, the control output circuits 222 and 224 respectively selectively send out the output voltages $V_{out1}$ and $V_{out2}$ by the third switches $S_3$ and $S_3'$.

In addition, the nodes of the output voltages $V_{out1}$ and $V_{out2}$ respectively obtain feedback voltage signals $V_{fb1}$ and $V_{fb2}$ from the equivalent variable loads 24 and 26. The control stage circuit 20 is coupled to the power stage 18 to receive the feedback voltage signals $V_{fb1}$ and $V_{fb2}$ and sends out a plurality of control signals $P_1$, $P_2$, $P_3$, and $P_4$ according to reference voltages $V_{Ref1}$ and $V_{Ref2}$. The control signals $P_1$, $P_2$, $P_3$, and $P_4$ can control the electric quantity of the output voltages $V_{out1}$ and $V_{out2}$. Then, the control stage circuit 20 respectively converts the control signals $P_1$, $P_2$, $P_3$, and $P_4$ into a plurality of order control signals $P_1'$, $P_2'$, $P_3'$ and $P_4'$ according to a duty cycle algorithm. The control stage circuit 20 selectively controls the order of adjusting energy and duty cycles of the output voltages $V_{out1}$ and $V_{out2}$ by the order control signals $P_1'$, $P_2'$, $P_3'$ and $P_4'$.

In the SIMO conversion device 10, a capacitive element $C_1$ is coupled between the second switch $S_2$ and the third switch $S_3$ and connected with the equivalent variable load 24 to selectively store the load current $I_{o1}$ and cushion the energy of the output voltage $V_{out1}$. A capacitive element $C_2$ is connected with the equivalent variable load 26 to selectively store the load current $I_{o2}$ and cushion the energy of the output voltage $V_{out2}$.

Besides, the control output circuit 222 further comprises a feedback circuit 28 and the control output circuit 224 further comprises a feedback circuit 30. The feedback circuit 28 connects with the capacitive element $C_1$ in parallel and the feedback circuit 30 connects with the capacitive element $C_2$ in parallel. The feedback circuit 28 has a first resistor $R_{f1}$ and a second resistor $R_{f2}$, and the feedback circuit 30 has a first resistor $R_{f1}'$ and a second resistor $R_{f2}'$. The second resistor $R_{f2}$ connects with the first resistor $R_{f1}$ in series and the second resistor $R_{f2}'$ connects with the first resistor $R_{f1}'$ in series.

The feedback circuit 28 uses a node between the first resistor $R_{f1}$ and the second resistor $R_{f2}$ to send out the feedback voltage signal $V_{fb1}$, and the feedback circuit 30 uses a node between the first resistor $R_{f1}'$ and the second resistor $R_{f2}'$ to send out the feedback voltage signal $V_{fb2}$. Finally, the control output circuit 222 selectively uses a node between the capacitive element $C_1$ and the first resistor $R_{f1}$ to send out the output voltage $V_{out1}$, and the control output circuit 224 selectively uses a node between the capacitive element $C_2$ and the first resistor $R_{f1}'$ to send out the output voltage $V_{out2}$.

The control stage circuit 20 comprises a plurality of error amplifiers 32, such as error amplifiers 322 and 324. The error amplifier 322 is coupled between the first resistor $R_{f1}$ and the second resistor $R_{f2}$ to receive the feedback voltage signal $V_{fb1}$. The error amplifier 324 is coupled between the first resistor $R_{f1}'$ and the second resistor $R_{f2}'$ to receive the feedback voltage signal $V_{fb2}$. Thus, the error amplifier 322 determines the feedback voltage signal $V_{fb1}$ according to the reference voltage $V_{Ref1}$, thereby sending out two error signals $V_{eo1+}$ and $V_{eo1-}$. The error amplifier 324 determines the feedback voltage signal $V_{fb2}$ according to the reference voltage $V_{Ref2}$, thereby sending out two error signals $V_{eo2+}$ and $V_{eo2-}$.

The control stage circuit 20 also comprises a plurality of hysteretic comparators, such as hysteretic comparators 342, 344, 346 and 348. The hysteretic comparator 342 is coupled to the error amplifier 322 to receive the error signal $V_{eo1+}$. The hysteretic comparator 342 determines the error signal $V_{eo1+}$ according to an internal input voltage $V_{ia1}$, so as to send out the control signal $P_1$. The hysteretic comparator 344 is coupled to the error amplifier 322 to receive the error signal $V_{eo1-}$. The hysteretic comparator 344 determines the error signal $V_{eo1-}$ according to an internal input voltage $V_{ib1}$, so as to send out the control signal $P_3$. The hysteretic comparator 346 is coupled to the error amplifier 324 to receive the error signal $V_{eo2+}$. The hysteretic comparator 346 determines the error signal $V_{eo2+}$ according to an internal input voltage $V_{ia2}$, so as to send out the control signal $P_2$. The hysteretic comparator 348 is coupled to the error amplifier 324 to receive the error signal $V_{eo2-}$. The hysteretic comparator 348 determines the error signal $V_{eo2-}$ according to an internal input voltage $V_{ib2}$, so as to send out the control signal $P_4$.

A current sensing circuit 36 is coupled to the inductor L and scales the immediate current $L_{rt}$ to send out a sense current $I_{sen}$. For example, current-sensing resistors are connected with two ends of the inductor L. Alternatively, a power stage power switch is scaled down to form a transistor, and the transistor is connected with the power switch in parallel. The current sensing circuit 36 scales the inductor current $I_L$ to generate the sense current $I_{SEN}$ based on the current mirror theory. Then, the current sensing circuit 36 determines the energy of the output voltage $V_{out1}$ and $V_{out2}$ according to the sense current $L_{sen}$. A load detection circuit 38 is coupled to the current sensing circuit 36 and the hysteretic comparators 342, 344, 346 and 348 to receive the sense current $L_{sen}$ and the control signals $P_1$, $P_2$, $P_3$, and $P_4$ and sends out the internal input voltages $V_{ia1}$, $V_{ib1}$, $V_{ia2}$ and $V_{ib2}$. A sequence change circuit 40 is coupled to the load detection circuit 38, uses an output signal $V_{sen\_sc}$ to determine whether to change the order control signals $P_1'$, $P_2'$, $P_3'$ and $P_4'$ and transmits the order control signals $P_1'$, $P_2'$, $P_3'$ and $P_4'$ to a control logic circuit 42 and a dead time buffer circuit 44 to change the order of adjusting the first switch $S_1$, the second switch $S_2$ and the third switch $S_3$. As a result, the load detection circuit 38 can determines the energy magnitude of the output voltage $V_{out1}$ and $V_{out2}$. With the change of the equivalent variable loads 24 and 26, the sequence change circuit 40 changes the order of adjusting the first switch $S_1$, the second switch $S_2$ and the third switch $S_3$ to control the order of adjusting the energy of the output voltage $V_{out1}$ and $V_{out2}$. The control logic circuit 42 is coupled to the load detection circuit 38, the first switch $S_1$, the second switch $S_2$ and the third switch $S_3$, and adjusts the control signals $P_1$, $P_2$, $P_3$, and $P_4$ according to the duty cycle algorithm, thereby receiving the order control signals $P_1'$, $P_2'$, $P_3'$ and $P_4'$ and determining whether to change them. Then, the control logic circuit 42 controls the energy of the output voltage $V_{out1}$ or $V_{out2}$ corresponding to the third switch $S_3$.

The control stage circuit 20 further comprises a dead time buffer circuit 44 coupled to the control logic circuit 42, receiving the control signals $P_1$, $P_2$, $P_3$ and $P_4$ and the order control signals $P_1'$, $P_2'$, $P_3'$ and $P_4'$ and preventing from simultaneously turning on the first switch $S_1$, the second switch $S_2$ and the third switch $S_3$.

Additionally, the power stage 18 is a DC to DC converter, and the first switch $S_1$, the second switch $S_2$ and the third switch $S_3$ are power stage switches. The power stage 18 is a synchronous boost type power stage, a synchronous buck type power stage, a synchronous buck and boost type power stage, a synchronous inverter type power stage, an asynchronous boost type power stage, an asynchronous buck type power stage, an asynchronous buck and boost type power stage, or an asynchronous inverter type power stage.

In order to clearly and fully disclose the present invention, the embodiment exemplifies the two control output circuit 22, the equivalent variable loads 24 and 26, the output voltages $V_{out1}$ and $V_{out2}$ and the load current $I_{o1}$ and $I_{o2}$ to enable person skilled in the art to understand the contents of and to practice the present invention. However, the present invention is not so limited. When the present invention applies to more equivalent variable loads 24 and 26, more control output circuits 22 are used, and the equivalent variable loads 24 and 26, the output voltages $V_{out1}$ and $V_{out2}$ and the load current $I_{o1}$ and $I_{o2}$ have the same amount, and the amounts of the error amplifiers 32, the hysteretic comparators 34, the control signals P and the order control signals P' correspondingly increase.

In the SIMO conversion device 10 for enlarging load range, when the first switch $S_1$ and the third switch $S_3$ are turned on and the second switch $S_2$ is turned off, the first transmission path is formed. When the second switch $S_2$ and the third switch $S_3$ are turned on and the first switch $S_1$ is turned off, the second transmission path is formed.

The present invention uses two control output circuits, such as the control output circuits 222 and 224. The control output circuits 222 and 224 respectively have the third switches $S_3$ and $S_3'$. Thus, the charge and discharge activities of the power stage 18 possess four energy transmission paths. When the first switch $S_1$ and the third switch $S_3$ are turned on and the second switch $S_2$ and the third switch $S_3'$ are turned off, the first transmission path is formed. When the second switch $S_2$ and the third switch $S_3$ are turned on and the first switch $S_1$ and the third switch $S_3'$ are turned off, the second transmission path is formed. When the first switch $S_1$ and the third switch $S_3'$ are turned on and the second switch $S_2$ and the third switch $S_3$ are turned off, the third transmission path is formed. When the second switch $S_2$ and the third switch $S_3'$ are turned on and the first switch $S_1$ and the third switch $S_3$ are turned off, the fourth transmission path is formed.

Figure 3:
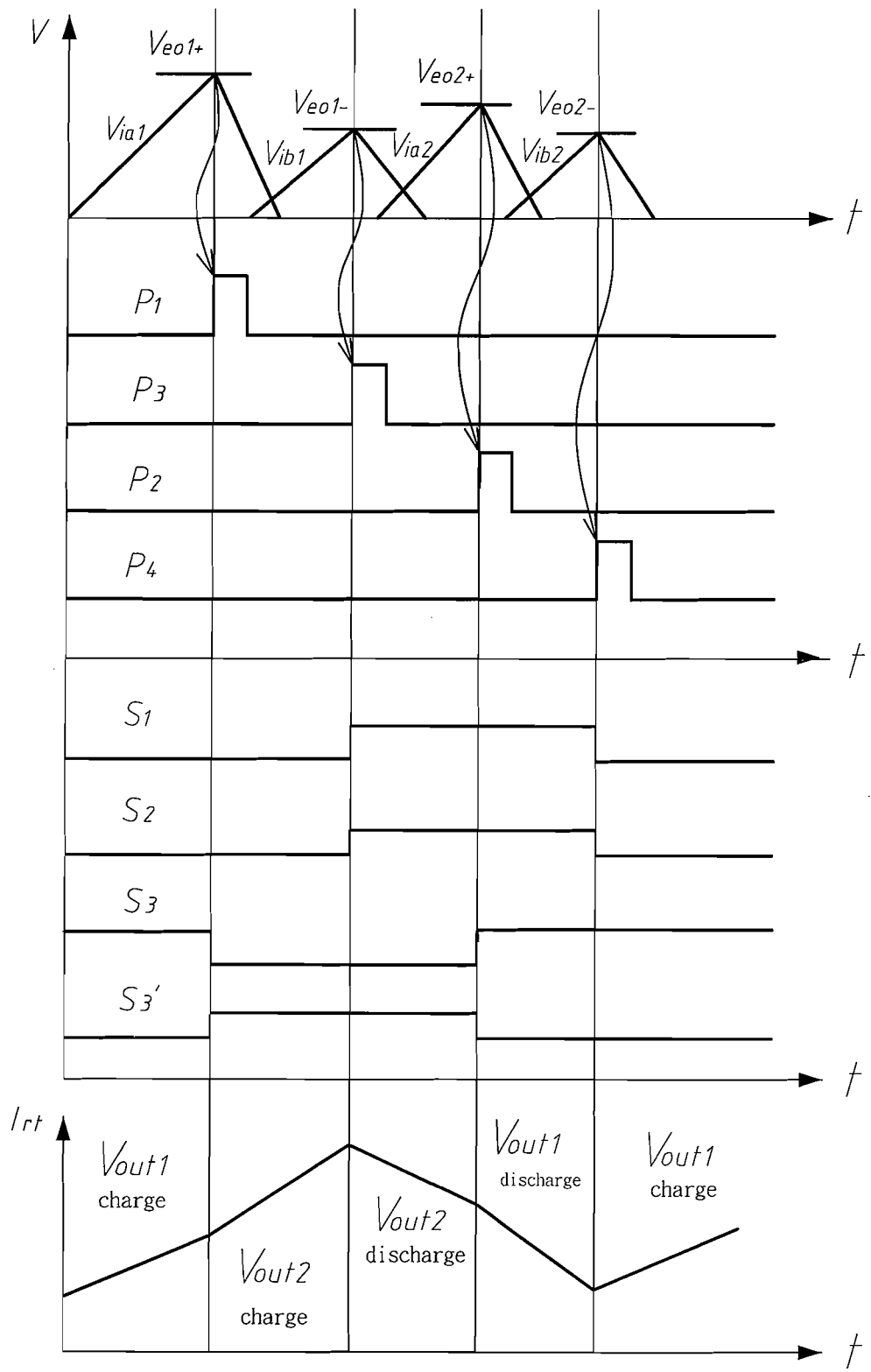
FIG. 3 is a diagram showing timing of switching order control signals according to an embodiment of the present invention.

Refer to FIG. 3 which explains the timing of switching the order control signals. According to the first, the second, the third and the fourth paths, FIG. 3 shows the charge and discharge timing of the error signals $V_{eo1+}/V_{eo1-}/V_{eo2+}/V_{eo2-}$, the order control signals $P_1'/P_2'/P_3'/P_4'$, the first switch $S_1$, the second switch $S_2$, the third switch $S_3/S_3'$, the immediate current $I_{rt}$ and the output voltages $V_{out1}/V_{out2}$ from top to bottom.

As shown in FIG. 2 and FIG. 3, when the current sensing circuit 36 obtains the immediate current $I_{rt}$, the error amplifiers 32 respectively sends out the error signals $V_{eo1+}$, $V_{eo1-}$, $V_{eo2+}$ and $V_{eo2-}$. The hysteretic comparators 34 respectively receive the error signals $V_{eo1+}$, $V_{eo1-}$, $V_{eo2+}$ and $V_{eo2-}$ and use the internal DC voltages $V_{ia1}$, $V_{ia2}$ and $V_{ib2}$ to send out the control signals $P_1$, $P_2$, $P_3$ and $P_4$. Thereby, the control logic circuit 42 controls the order of adjusting the energy of the output voltages $V_{out1}$ and $V_{out2}$ of the third switch $S_3$.

As shown in FIG. 3, when the first and third switches $S_1$ and $S_3$ are turned on and the second switch $S_2$ is turned off, the output voltage $V_{out1}$ is charged. The error signal $V_{eo1+}$ is obtained to trigger the control signal $P_1$, thereby turning on the third switch $S_3$ and turning off the third switch $S_3'$. Then, the output voltage $V_{out2}$ is charged. The error signal $V_{eo1-}$ is obtained to trigger the control signal $P_3$, thereby turning on the second switch $S_2$ and turning off the first switch $S_1$. Then, the output voltage $V_{out2}$ is discharged. The error signal $V_{eo2+}$ is obtained to trigger the control signal $P_2$, thereby turning on the third switch $S_3$ and turning off the third switch $S_3'$. Then, the output voltage $V_{out1}$ is discharged. The error signal $V_{eo2-}$ is obtained to trigger the control signal $P_4$ to start the next cycle.

In conclusion, the SIMO conversion device 10 for enlarging load range solves the cross regulation of outputs caused by reducing load variation in energy-conservation mode (ECM) and enlarges the load range of the outputs. When the output loads seriously change, the SIMO conversion device increases the transient response speed to rapidly regulate voltages.

The abovementioned is roughly described. The detail elements and the operations thereof in cooperation with figures are introduced as the followings to prove that the present invention solves the cross regulation of outputs caused by reducing load variation in ECM and enlarges the load range of the outputs.

In the traditional technology, ECM operates in a close load state or an identical state, such as a light-load state or a heavy-load state, the affection on different control modes is smaller, since the energy that the output voltages $V_{out1}$ and $V_{out2}$ require is close. On the contrary, when the energy that the load currents $I_{o1}$ and $I_{o2}$ require has a great difference, the most serious cross regulation will occur. For example, one load current is a light-load current, and another load current is a heavy-load current.

In order to solve the cross regulation in the traditional technology, the SIMO conversion device 10 for enlarging load range provides output load detection and order-switching control technique in ECM. The switching technique can reduce the impedance and affection of the equivalent variable loads 24 and 26. Accordingly, the cross regulation caused by changing the equivalent variable loads 24 and 26 is reduced and the output ranges of the equivalent variable loads 24 and 26 are effectively enlarged. When the equivalent variable loads 24 and 26 seriously change, the switching technique can immediately change the control order to increase the transient response speed to rapidly regulate voltages.

Figure 4A:
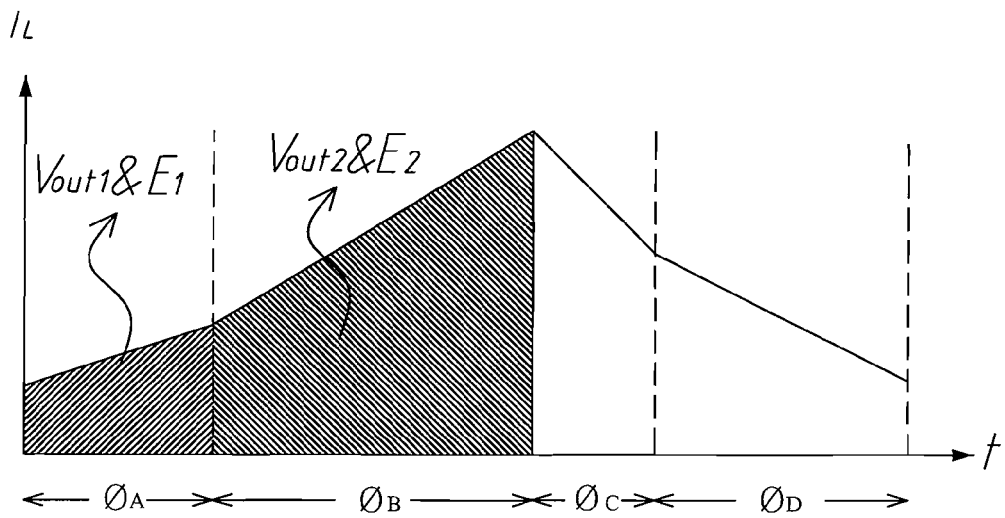
FIG. 4a is a schematic diagram showing an inductor current in a switched mode of energy-conversation mode according to an embodiment of the present invention.
Figure 4B:
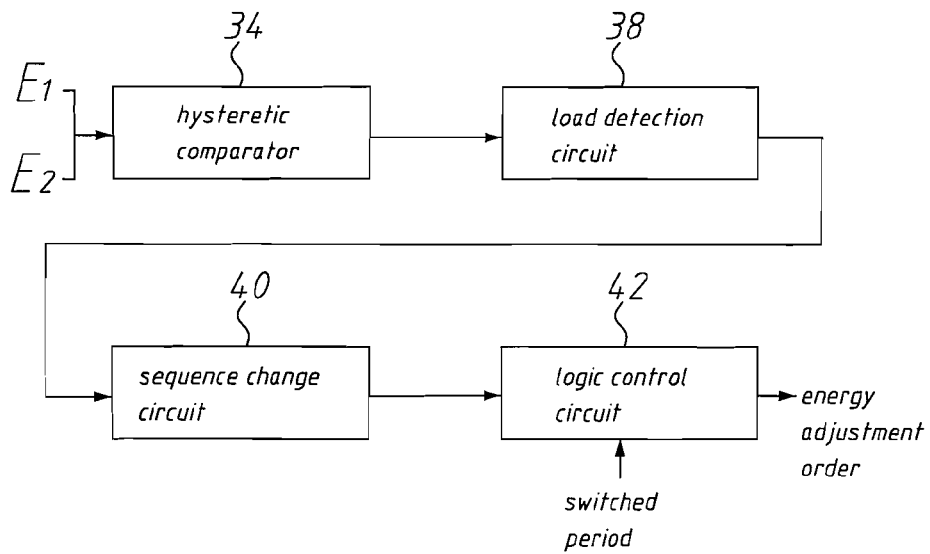
FIG. 4b is a schematic diagram showing an energy adjustment circuit of a SIMO conversion device for enlarging load range according to an embodiment of the present invention.

In regard to the abovementioned technology, refer to FIG. 4a and FIG. 4b which respectively show the inductor current in a switched mode of ECM and an energy adjustment circuit of the SIMO conversion device for enlarging load range. Refer to FIG. 2 again. The output voltages $V_{out1}$ and $V_{out2}$ of the SIMO conversion device 10 for enlarging load range respectively correspond to the load currents $I_{o1}$ and $I_{o2}$. The energy $E_1$ and $E_2$ respectively represent the load requirements of the output voltages $V_{out1}$ and $V_{out2}$. The energy $E_1$ and $E_2$ are respectively proportioned to the load currents $I_{o1}$ and $I_{o2}$.

The SIMO conversion device 10 for enlarging load range mainly finds out the requirement and the magnitude of the load currents $I_{o1}$ and $I_{o2}$ corresponding to the equivalent variable loads 24 and 26 and compares the load currents $I_{o1}$ and $I_{o2}$. The SIMO conversion device 10 uses the determination mechanism to decide the magnitude order of the energy $E_1$ and $E_2$ of the equivalent variable loads 24 and 26, thereby changing the order of adjusting the output voltages $V_{out1}$ and $V_{out2}$ to obtain the most suitable distribution of the energy $E_1$ and $E_2$.

From FIG. 4a, the present invention uses the load detection circuit 38 to immediately detect the energy requirement of the output voltages $V_{out1}$ and $V_{out2}$ within each switched period. As a result, the energy $E_1$ and $E_2$ are respectively Obtained. Then, the hysteretic comparators 342, 344, 346 and 348 compare the difference of the voltage level to obtain the magnitude of the energy $E_1$ and $E_2$. The sequence change circuit 40 determines whether to send out the signals of switching the adjustment order, wherein the order control signal $P_1'$, $P_2'$, $P_3'$ and $P_4'$ are used as the determination mechanism of the control logic circuit 42 and the dead time buffer circuit 44.

Based on the determination mechanism, the SIMO conversion device 10 for enlarging load range suitably performs the detection and adjusts the order-switching technique according to the requirement of the different equivalent variable loads 24 and 26. The order control signal $P_1'$, $P_2'$, $P_3'$ and $P_4'$ adjust the output voltages $V_{out1}$ and $V_{out2}$ according to the order from the small requirement of the energy $E_1$ or $E_2$ closer to the large requirement of the energy $E_2$ or $E_1$.

In ECM, the inductor current $I_L$ starts to sequentially storage energy from an initial state. Since the inductor current $I_L$ of the output voltage $V_{out1}$ or $V_{out2}$ of the later order is usually higher, the more energy is easily obtained (as shown in FIG. 4a, $E_2 > E_1$). The present invention uses the load detection and the order-switching control technique to rearrange the order of adjusting the output voltages $V_{out1}$ and $V_{out2}$ according to the equivalent variable loads 24 and 26. The adjustment activities are performed according to the order from the small energy requirement closer to the large energy requirement lest the cross regulation be induced.

In ECM of the traditional technology, when the load current $I_{o1}$ or $I_{o2}$ of the output voltage $V_{out1}$ or $V_{out2}$ of the previous adjustment order corresponds to a heavy load and the load current $I_{o2}$ or $I_{o1}$ of the output voltage $V_{out2}$ or $V_{out1}$ of the later adjustment order corresponds to a light load, the average value of the load current $I_{o2}$ or $I_{o1}$ of the later adjustment order increases. The increased average value makes the output voltage $V_{out2}$ and $V_{out1}$ inaccurate. As a result, the load current $I_{o1}$ or $I_{o2}$ is limited. The difference between the load current $I_{o1}$ and $I_{o2}$ can be not enlarged whereby the range of the load current $I_{o1}$ or $I_{o2}$ is reduced to limit the application of the output conversion device.

The following effect is obtained by the switching technique of the present invention: 1. Reduce the cross regulation of outputs caused by changing the equivalent variable loads 24 and 26 in ECM and effectively enlarge the range of the equivalent variable loads 24 and 26. 2. Increase the transient response speed to rapidly regulate voltages when the equivalent variable loads 24 and 26 seriously change. In regard to the abovementioned features, the explanation is described as the followings in cooperation with the figures.

Refer to FIGS. 5a~5e which respectively a waveform showing the inductor current without changing the order of controlling loads according to the first case, a waveform showing the inductor current with changing the order of controlling loads according to the first case, a waveform showing the inductor current without changing the order of controlling loads according to the second case, a waveform showing the inductor current with changing the order of controlling loads according to the second case and a diagram showing the change of controlling the order. Refer to FIG. 2, FIG. 4a and FIG. 4b again. As the abovementioned Feature 1, FIG. 4a shows the energy requirement change of the SIMO conversion device 10 for enlarging load range of the present invention.

Figure 5A:
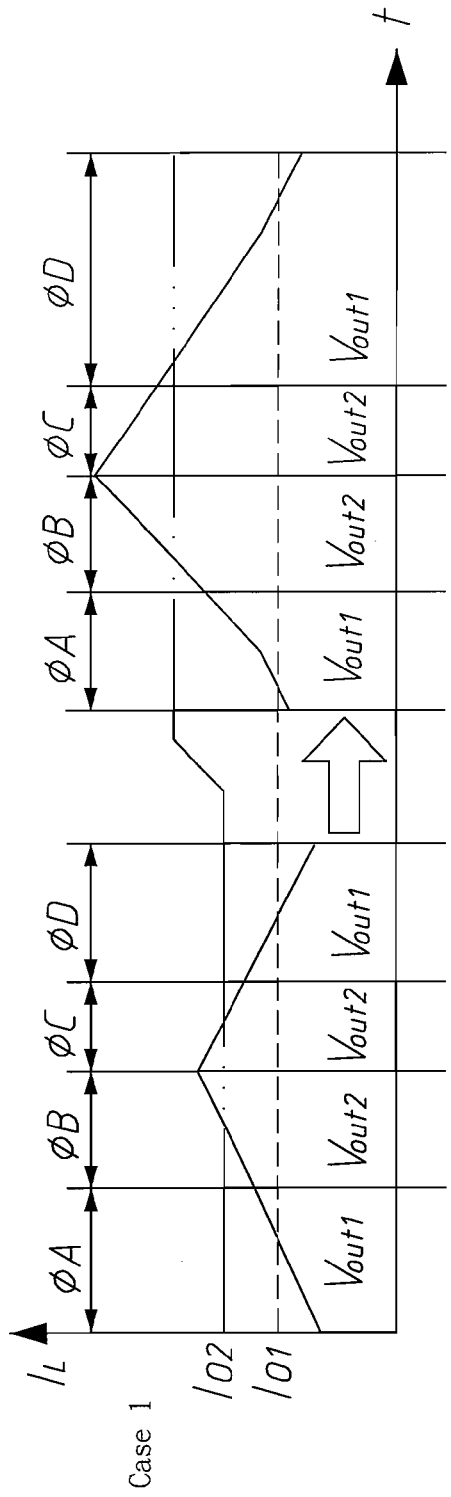
FIG. 5a is a waveform showing the inductor current without changing the order of controlling loads according to the first case of the present invention.
Figure 5B:
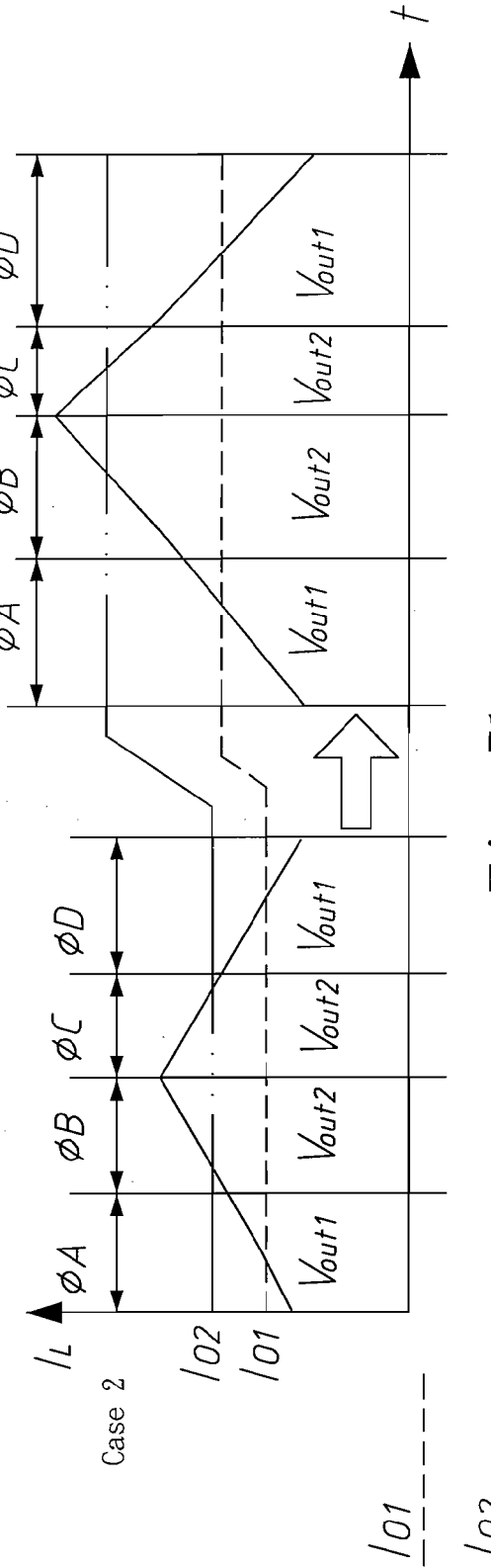
FIG. 5b is a waveform showing the inductor current with changing the order of controlling loads according to the first case of the present invention.
Figure 6A:
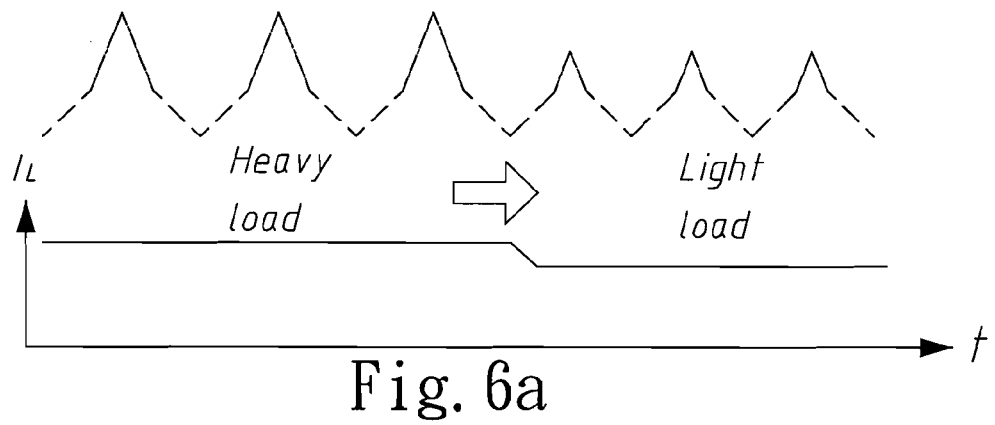
FIG. 6a is a schematic diagram showing the inductor current without changing the order of controlling loads for the load current $I_{O2}$ operating from a heavy-load state to a light-load state.
Figure 6B:
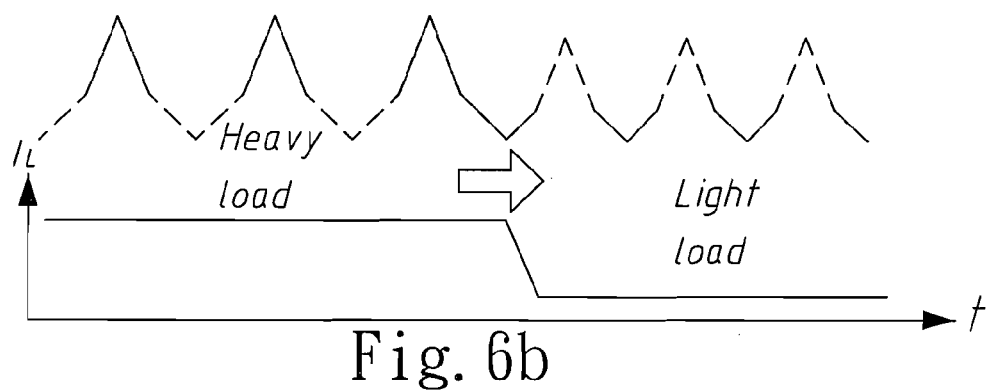
FIG. 6b is a schematic diagram showing the inductor current with changing the order of controlling loads for the load current $I_{O2}$ operating from a heavy-load state to a light-load state.
Figure 6C:
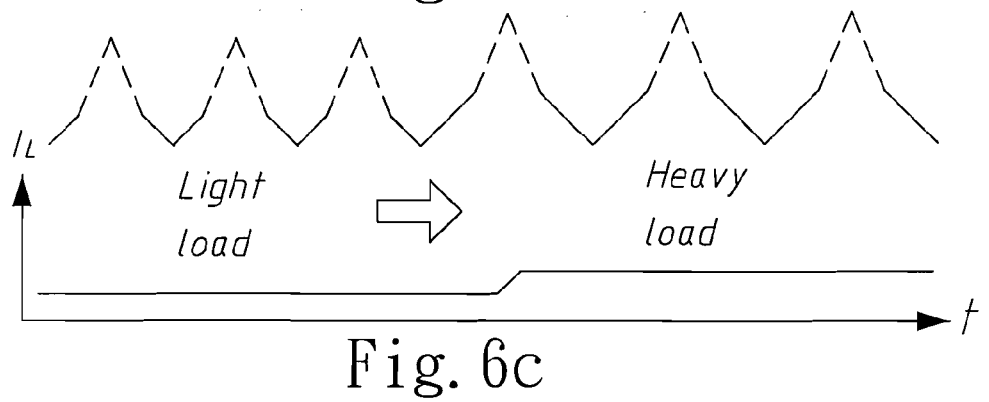
FIG. 6c is a schematic diagram showing the inductor current without changing the order of controlling loads for the load current $I_{O2}$ operating from a light-load state to a heavy-load state.
Figure 6D:
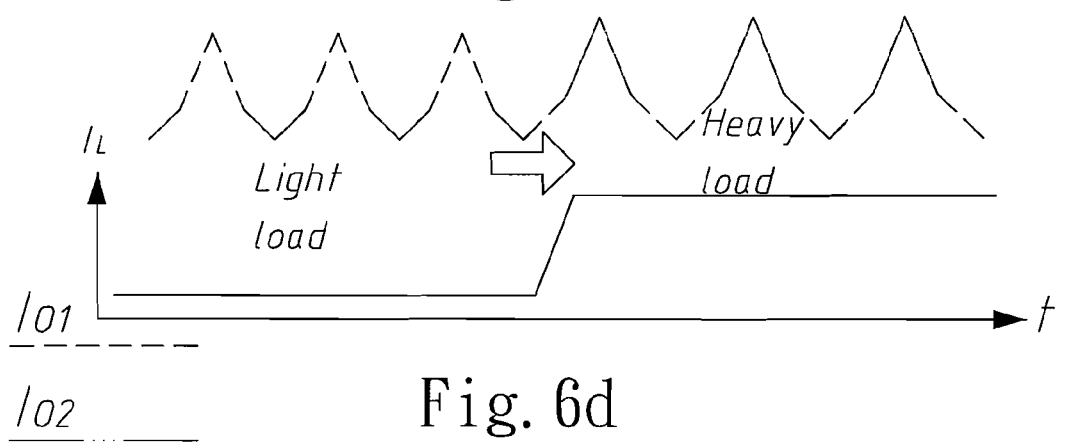
FIG. 6d is a schematic diagram showing the inductor current with changing the order of controlling loads for the load current $I_{O2}$ operating from a light-load state to a heavy-load state.

The load detection circuit 38 and the sequence change circuit 40 perform the load detection and the order-switching control technique which is divided into two conditions:

(1) The output order not to need adjustment: As shown in FIG. 5a and FIG. 5b, when the energy requirement of the output voltage $V_{out1}$ is less than that of the output voltage $V_{out2}$, the sequence change circuit 40 adjusts the output voltage $V_{out1}$ and the output voltage $V_{out2}$ in order. When the load current $I_{o1}$ of the output voltage $V_{out1}$ is unchanged and the load current $I_{o2}$ of the output voltage $V_{out2}$ is increased, the load detection circuit 38 does not perform the switching activity due to the fact that the present adjustment order is the best. As long as the load detection circuit 38 adjusts the duty cycle, the average current value that the output voltages $V_{out1}$ and $V_{out2}$ require is satisfied.

(2) The output order to need adjustment: As shown in FIG. 5c and FIG. 5d, when the energy requirement of the output voltage $V_{out1}$ is less than that of the output voltage $V_{out2}$, the sequence change circuit 40 adjusts the output voltage $V_{out1}$ and the output voltage $V_{out1}$ in order. When the load current $I_{o2}$ of the output voltage $V_{out2}$ is unchanged and the load current $I_{o1}$ of the output voltage $V_{out2}$ is increased, it is found that adjusting the duty cycle of the output voltage $V_{out1}$ of the previous adjustment order does not satisfy the load requirement. Besides, the duty cycle of the output voltage $V_{out1}$ is seriously increased to compress the duty cycle of the output voltage $V_{out2}$. As a result, the load current $I_{o2}$ is greatly increased to result in an error voltage level.

Since the load detection circuit 38 determines the energy magnitude of the output voltages $V_{out1}$ and $V_{out2}$ and the sequence change circuit 40 determines whether to perform the switching activity, the load detection circuit 38 and the sequence change circuit 40 can determine that the energy requirement of the output voltage $V_{out1}$ is larger than that of the output voltage $V_{out2}$ according to the load detection and the order-switching control technique. As a result, the sequence change circuit 40 switches the adjustment order. The error amplifiers 32, the hysteretic comparators 34 and the control logic circuit 42 firstly adjust the original output voltage $V_{out1}$ according to the duty cycle algorithm. Then, according to the error signals $V_{eo1+}$, $V_{eo1-}$, $V_{eo2+}$ and $V_{eo2-}$ obtained by the error amplifiers 32 and the control signals $P_1$, $P_2$, $P_3$, and $P_4$ obtained by the hysteretic comparators 34, the control logic circuit 42 adjusts the output voltage $V_{out2}$ and the output voltage $V_{out1}$ in order. Since the adjustment order of the output voltage $V_{out1}$ is the later one, the inductor current $I_L$ of the output voltage $V_{out1}$ is higher. Accordingly, the more energy is easily obtained to meet that fact that the load current $I_{o1}$ of the output voltage $V_{out1}$ increases.

From FIGS. 5a~5e, how the output order affects the load currents $I_{o1}$ and $I_{o2}$ in the first and second cases is found. For example, in the second case, the load current $I_{o2}$ of the output voltage $V_{out2}$ of the later adjustment order maintains the fixed load requirement. However, since the load requirement increases, the load current $I_{o1}$ of the output voltage $V_{out1}$ of the previous adjustment order seriously affects the load current $I_{o2}$.

In order to solve the problem, the present invention uses the load detection circuit 38 to determine the energy magnitude of the output voltages $V_{out1}$ and $V_{out2}$, and the sequence change circuit 40 determines whether to perform the switching activity, and the error amplifiers 32, the hysteretic comparators 34 and the control logic circuit 42 automatically adjust the output order of the output voltages $V_{out1}$ and $V_{out2}$ according to the duty cycle algorithm. For example, in the second case of FIG. 5c, the change of the output order is shown in FIG. 5d. The affection on the load current $I_{o2}$ caused by the load current $I_{o1}$ can be reduced, and the output order is schematically shown in FIG. 5e.

In the second case of FIG. 5d, on condition of the same load currents, it is apparent that the affection on the load current $I_{o2}$ with changing the output order is less than that on the load current $I_{o2}$ without changing the output order when the order of the charge activity changes. Since the load current $I_{o2}$ belongs to the previous adjustment order such that the inductor current $I_L$ stores energy in advance, the average value of the inductor current is increased when adjusting the load current $I_{o1}$ later. Since the load requirement increases, the load current $I_{o1}$ has to operate in a heavy-load state whereby the load current $I_{o1}$ is not affected too seriously. According to the second case of FIG. 5d, a supposition is obtained. When the output voltages $V_{out1}$ and $V_{out2}$ operate in a heavy-load state, the load currents $I_{o1}$ and $I_{o2}$ are increased together. Meanwhile, the load current $I_{o2}$ has to operate in a heavy-load state since the load requirement becomes heavier. As a result, the load current $I_{o2}$ is not affected too seriously by the load current $I_{o1}$. In addition, the load current $I_{o1}$ is helpful to the adjustment of the load current $I_{o1}$ in the heavy-load state to reduce the variation of the duty cycle.

The present invention explains the abovementioned Feature 2 in detail as the followings. Refer to FIGS. 6a~6e which respectively a schematic diagram showing the inductor current without changing the order of controlling loads for the load current $I_{O2}$ operating from a heavy-load state to a light-load state, a schematic diagram showing the inductor current with changing the order of controlling loads for the load current $I_{O2}$ operating from a heavy-load state to a light-load state, a schematic diagram showing the inductor current without changing the order of controlling loads for the load current $I_{O2}$ operating from a light-load state to a heavy-load state and a schematic diagram showing the inductor current with changing the order of controlling loads for the load current $I_{O2}$ operating from a light-load state to a heavy-load state. Refer to FIG. 2 again. The load detection and the order-switching control technique can immediately detect the state of the equivalent variable loads 24 and 26 to obtain the best adjustment order of the SIMO conversion device 10 for enlarging load range. When the equivalent variable load 24 or 26 changes, the switching technique can increases the transient response speed and reduce the voltage variation of the SIMO conversion device 10 for enlarging load range in transient change, as shown in FIG. 6a~6d.

In FIG. 6a~6d, suppose the energy requirement of the output voltage $V_{out1}$ is less than that of the output voltage $V_{out2}$ in an initial state. The output voltages $V_{out1}$ and $V_{out2}$ are adjusted in order. The load current $I_{O1}$ corresponds to the output voltages $V_{out1}$ of the previous adjustment order, and the load current $I_{O2}$ corresponds to the output voltages $V_{out2}$ of the later adjustment order. If the energy requirement of the output voltage $V_{out1}$ is larger than that of the output voltage $V_{out2}$ in the initial state, the initial inductor current $I_L$ is affected by the output voltage $V_{out1}$ in the previous switched period. In other words, the energy of the inductor current $I_L$ is not increased to a higher value until the adjustment activity of the output voltage $V_{out2}$ is performed. However, the load requirement of the output voltage $V_{out2}$ changes from a heavy-load state to a light-load state at this time. The higher level of the initial inductor current $I_L$ conflicts the lower load requirement, which saws transient energy and affects the speed of adjusting energy to cause the worst transient response.

When the energy requirement of the output voltage $V_{out2}$ changes from high to low, the SIMO conversion device 10 uses the load detection and the order-switching control technique to detect a state to need adjustment. The control logic circuit 42 will sequentially adjust the output voltage $V_{out1}$ and $V_{out2}$. Then, the control logic circuit 42 sequentially adjusts the output voltages $V_{out2}$ and $V_{out1}$. Thus, the output voltages $V_{out2}$ is adjusted at the lower energy level of the inductor current $I_L$, and the duty cycle is suitably adjusted to provide the energy required. Since the competition problem with original energy states is solved, the energy requirements of the equivalent variable loads 24 and 26 of the output voltages $V_{out1}$ and $V_{out2}$ are rapidly changed to attain the output specification with fast response and stable voltages. From the same token, the contrary verification is obtained according to FIGS. 6a~6d.

In conclusion, the SIMO conversion device 10 for enlarging load range uses the load detection and the order-switching control technique to bring a lot of advantages which are simply verified. In ECM, the present invention uses the current sensing circuit to obtain the immediate current and switches control signals to establish the best order thereof according to different loads, thereby solving the problem with cross regulation and load range limitation due to the fixed adjustment order. Due to the properties, the present invention can reduce the impedance and affection of different loads. When one load changes seriously, the conversion device can rapidly perform the adjustment activity to reduce the impedance of output loads in the traditional technology. Therefore, the output range of load energy is enlarged, the large variations of the load currents are tolerated, the output voltages are stably maintained, and the cross regulation is reduced.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A single-inductor multi-output (SIMO) conversion device for enlarging load range coupled to an input voltage terminal which has a direct-current (DC) voltage source and a grounding terminal to send out a DC current, and said SIMO conversion device sends out a plurality of output voltages to a plurality of loads respectively, and said SIMO conversion device comprises:
   a power stage comprising:
   a first switch coupled to said DC voltage source to receive said DC current;
   a second switch coupled between said first switch and said grounding terminal to receive said DC current, and said first switch, said second switch and said DC voltage source constitute an electric loop;
   an inductor coupled between said first switch and said second switch, and said DC voltage source sends out said DC current to said inductor selectively by said first switch or said second switch, whereby said inductor sends out an immediate current, or whereby said second switch discharges an inductor current to said grounding terminal; and
   a plurality of control output circuits each having a third switch, and each said third switch connects with said inductor in series to receive said immediate current, and said control output circuit sends out said output voltage selectively by said third switch and obtains a feedback voltage signal from corresponding said load according to said immediate current; and
   a control stage circuit coupled to said power stage to receive said feedback voltage signals, sending out a plurality of control signals according to a reference voltage, respectively converting said control signals into a plurality of order control signals according to a duty cycle algorithm, and selectively controlling an order of adjusting energy of said output voltages by said order control signals, and said control stage circuit further comprises:
   a plurality of error amplifiers respectively coupled to said control output circuits to respectively receive said feedback voltage signal, and each said error amplifier determines said feedback voltage signal according to said reference voltage, thereby sending out two error signals;

a plurality of hysteretic comparators, and every two said hysteretic comparators is coupled to one said error amplifier to receive said error signals, and each said hysteretic comparator determines said error signal according to an internal input voltage, so as to send out said control signal;

a current sensing circuit coupled to said inductor, scaling said immediate current to send out a sense current, and determining energy of said output voltage according to said sense current;

a load detection circuit coupled to said current sensing circuit and said hysteretic comparators to receive said sense current and said control signals, sending out said internal input voltages, and determining energy magnitude of said output voltage;

a sequence change circuit coupled to said load detection circuit to receive said control signals, and realizing said order control signals for next period according to said duty cycle algorithm; and a control logic circuit coupled to said load detection circuit, said first switch, said second switch and said third switch, and adjusting said control signals according to said duty cycle algorithm, thereby receiving said order control signals and determining whether to change them, and then controlling energy of said output voltage of said third switch.

2. The SIMO conversion device for enlarging load range according to claim 1, wherein each said output voltage has a load current, and each said control output circuit further comprises a capacitive element coupled between said second switch and said third switch to selectively store said load current and cushion energy of said output voltage.

3. The SIMO conversion device for enlarging load range according to claim 2, wherein each said control output circuit further comprises a feedback circuit connecting with said capacitive element in parallel and having a first resistor and a second resistor, and said second resistor connects with said first resistor in series, and said error amplifier is coupled between said first resistor and said second resistor, and said feedback circuit uses a node between said first resistor and said second resistor to send out said feedback voltage signal, and selectively uses a node between said capacitive element and said first resistor to send out said output voltage.

4. The SIMO conversion device for enlarging load range according to claim 1, wherein said control stage circuit further comprises a dead time buffer circuit coupled to said control logic circuit, receiving said control signals and said order control signals and preventing from turning on said first switch, said second switch and said third switch.

5. The SIMO conversion device for enlarging load range according to claim 1, wherein when said first switch and said third switch are turned on and said second switch is turned off, a first transmission path is formed, and when said second switch and said third switch are turned on and said first switch is turned off, a second transmission path is formed.

6. The SIMO conversion device for enlarging load range according to claim 1, wherein said power stage is a DC to DC converter, and said first switch, said second switch and said third switch are power stage switches.

7. The SIMO conversion device for enlarging load range according to claim 1, wherein said power stage is a synchronous boost type power stage, a synchronous buck type power stage, a synchronous buck and boost type power stage, a synchronous inverter type power stage, an asynchronous boost type power stage, an asynchronous buck type power stage, an asynchronous buck and boost type power stage, or an asynchronous inverter type power stage.

* * * * *